(12) United States Patent
Nakashima et al.

(10) Patent No.: US 9,217,650 B2
(45) Date of Patent: Dec. 22, 2015

(54) INFORMATION PROCESSING SYSTEM, INFORMATION PROCESSING DEVICE AND CENTER SERVER

(71) Applicants: TOYOTA JIDOSHA KABUSHIKI KAISHA, Toyota-shi (JP); DENSO CORPORATION, Kariya-shi (JP)

(72) Inventors: Hiroki Nakashima, Kawasaki (JP); Teruhide Hayashida, Minato-ku (JP); Kengo Hayashi, Toshima-ku (JP); Koichi Nakao, Shinagawa-ku (JP)

(73) Assignees: TOYOTA JIDOSHA KABUSHIKI KAISHA, Toyato-shi (JP); DENSO CORPORATION, Kariya-shi (JP)

( * ) Notice: Subject to any disclaimer, the term of this patent is extended or adjusted under 35 U.S.C. 154(b) by 0 days.

(21) Appl. No.: 14/358,587

(22) PCT Filed: Nov. 15, 2012

(86) PCT No.: PCT/JP2012/079664
§ 371 (c)(1),
(2) Date: May 15, 2014

(87) PCT Pub. No.: WO2013/073616
PCT Pub. Date: May 23, 2013

(65) Prior Publication Data
US 2014/0324334 A1 Oct. 30, 2014

(30) Foreign Application Priority Data
Nov. 16, 2011 (JP) .................................. 2011-250899

(51) Int. Cl.
*G01C 21/34* (2006.01)
*G01C 21/36* (2006.01)
(Continued)

(52) U.S. Cl.
CPC ............ *G01C 21/3629* (2013.01); *G01C 21/32* (2013.01); *G01C 21/3641* (2013.01); *G01C 21/3644* (2013.01); *G06Q 10/047* (2013.01)

(58) Field of Classification Search
CPC ............... G01C 21/3629; G01C 21/32; G01C 21/3644; G01C 21/3641; G06Q 10/047; G06F 13/00
See application file for complete search history.

(56) References Cited

U.S. PATENT DOCUMENTS

2008/0319645 A1  12/2008  Kumagai et al.
2010/0082437 A1  4/2010   Tamayama et al.
(Continued)

FOREIGN PATENT DOCUMENTS

CN  1606895 A   4/2005
EP  1 457 089    9/2004
(Continued)

OTHER PUBLICATIONS

"Applicants proposed amendments Sep. 15, 2015"; authored by: Kevin Ross Davis; recieved Sep. 15, 2015.*
(Continued)

*Primary Examiner* — James Trammell
*Assistant Examiner* — James E Stroud
(74) *Attorney, Agent, or Firm* — Oblon, McClelland, Maier & Neustadt, L.L.P.

(57) ABSTRACT

An information processing system includes a center server, a first moving object that performs communication with the center server, and a second moving object that performs communication with the center server. The first moving object includes a submission information acquisition unit that acquires submission information related to a travel guiding, and a submission information transmission unit that transmits the submission information to the center server. The center server includes a guiding information accumulation unit that accumulates guiding information which is based on the submission information. The second moving object includes a travel guiding execution unit that executes the travel guiding for the second moving object with respect to the traveling route to the preset destination. The travel guiding execution unit executes the travel guiding using the guiding information of the guiding information accumulation unit.

6 Claims, 9 Drawing Sheets

(51) Int. Cl.
*G06Q 10/04* (2012.01)
*G01C 21/32* (2006.01)

(56) References Cited

U.S. PATENT DOCUMENTS

| | | |
|---|---|---|
| 2011/0098056 A1* | 4/2011 | Rhoads et al. ............ 455/456.1 |
| 2011/0161076 A1* | 6/2011 | Davis et al. .................. 704/231 |
| 2011/0291860 A1 | 12/2011 | Ozaki et al. |
| 2012/0004956 A1* | 1/2012 | Huston et al. ............... 705/14.1 |
| 2012/0191341 A1 | 7/2012 | Nara et al. |
| 2014/0136098 A1* | 5/2014 | Stroila et al. ................. 701/408 |
| 2014/0343846 A1* | 11/2014 | Goldman et al. ............ 701/525 |
| 2014/0370844 A1* | 12/2014 | Lara et al. .................... 455/405 |

FOREIGN PATENT DOCUMENTS

| | | |
|---|---|---|
| JP | 2002-081951 | 3/2002 |
| JP | 2009-002817 | 1/2009 |
| JP | 2010-038778 | 2/2010 |
| JP | 2010-102685 | 5/2010 |
| JP | 2010-127837 | 6/2010 |
| JP | 2011-033445 | 2/2011 |
| JP | 2011-247832 | 12/2011 |
| JP | 2012-247273 | 12/2012 |
| WO | WO 03/056865 A1 | 7/2003 |

OTHER PUBLICATIONS

International Search Report issued Jan. 29, 2013, in PCT/JP2012/079664, filed Nov. 15, 2012.

* cited by examiner

Fig.9
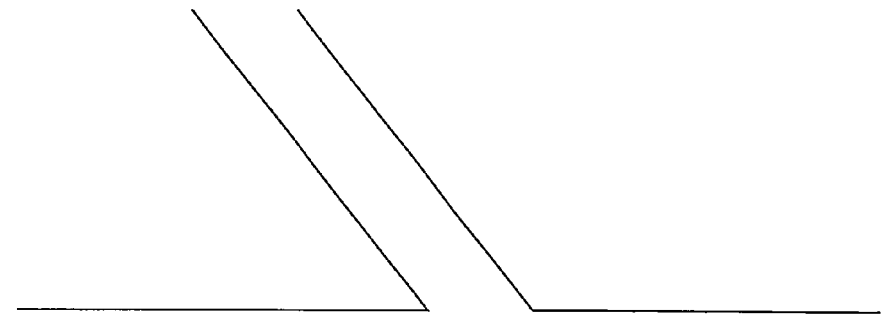
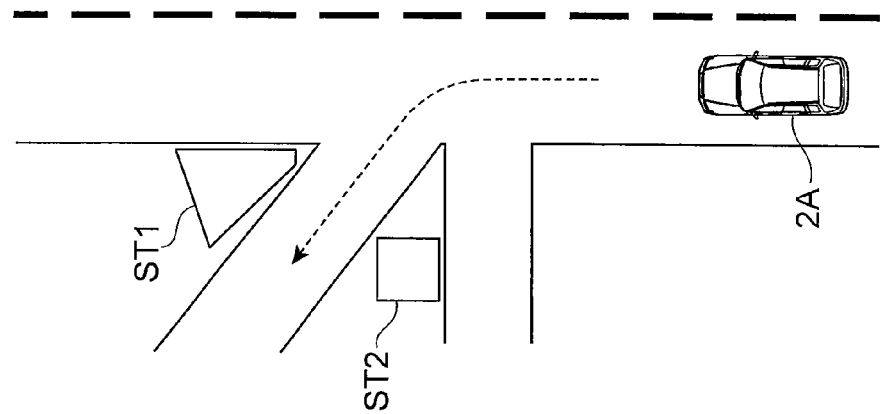
(b)
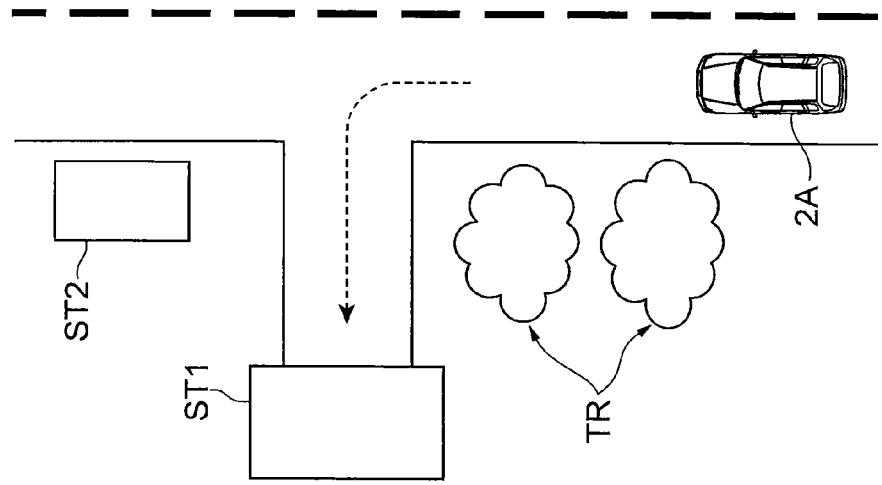
(a)

INFORMATION PROCESSING SYSTEM, INFORMATION PROCESSING DEVICE AND CENTER SERVER

TECHNICAL FIELD

The present invention relates to an information processing system, an information processing device, and a center server.

BACKGROUND ART

In the related art, when a travel guiding is performed for a vehicle, a device that guides a driver in advance with a voice in a case of turning right or left such that the driver need not look at the display is known. The device in the related art performs a voice guiding for a lane change or right or left turns in a uniform manner based on map data kept in advance and certain parameters. In addition, in the related art, a device disclosed in Patent Literature 1 is known. When a vehicle arrives at a guide point such as an intersection, the device reads a facility which may be a candidate for a landmark out of the facilities present near the intersection from map information. Then, by notifying of the facility that exists on the destination at the corner as a marker, the device provides an easy-to-understand guiding.

CITATION LIST

Patent Literature

[Patent Literature 1] Japanese Unexamined Patent Application Publication No. 2010-127837

SUMMARY OF INVENTION

Technical Problem

However, in the device described above, even though the facility is shown as the marker, there has been a case where the easy-to-understand guiding is not possible for the driver who is actually performing the right or left turn. For example, there is a case where it becomes difficult to recognize the notified marker due to changes in the status of surroundings of the landmark as time passes by. In addition, there is also a case where the landmark becomes difficult to recognize due to the relationship with the surrounding environment for the actual driver. Like this, there has been a case where the optimal guiding cannot be always performed for the driver who is actually traveling on the road.

The present invention is made to solve the problem described above, and has an object to provide an information processing system, an information processing device, and a center server that enable an easy-to-understand travel guiding for a user to be performed.

Solution to Problem

An information processing system according to an aspect of the present invention includes: a center server; a first moving object that performs communication with the center server; and a second moving object that performs communication with the center server. The first moving object includes a submission information acquisition unit that acquires submission information related to a travel guiding, and a submission information transmission unit that transmits the submission information to the center server. The center server includes a guiding information accumulation unit that accumulates guiding information which is based on the submission information. The second moving object includes a travel guiding execution unit that executes the travel guiding for the second moving object with respect to a traveling route to a preset destination. The travel guiding execution unit executes the travel guiding using the guiding information of the guiding information accumulation unit.

In the information processing system, the travel guiding execution unit of the second moving object executes the travel guiding using the guiding information of the guiding information accumulation unit of the center server. The guiding information accumulated in the guiding information accumulation unit of the center server is information which is based on the submission information submitted from the first moving object that is different from the second moving object in which the travel guiding is executed. That is, the guiding information used in the travel guiding is information which is based on the submission information from the first moving object that actually travels along the road or the like. In this way, the travel guiding execution unit of the second moving object can perform the easy-to-understand travel guiding for a driver of the second moving object.

In addition, the center server further includes a guiding information extraction unit that extracts the guiding information from the guiding information accumulation unit based on path information of the second moving object. The submission information transmission unit transmits travel trajectory information of the first moving object in association with the submission information to the center server. The guiding information extraction unit extracts the guiding information by comparing the path information of the second moving object with the travel trajectory information of the first moving object which is in association with the submission information. In this way, the guiding information extraction unit of the center server can extract only the guiding information necessary for the traveling route along which the second moving object tries to travel.

In addition, the submission information is voice data from an occupant of the first moving object. Since the voice data is used, the occupant of the first moving object can easily generate the submission information even during the driving operation.

A center server performs communication between a first moving object and a second moving object. The center server includes: a submission information receiving unit that receives submission information related to a travel guiding from the first moving object; a guiding information accumulation unit that accumulates guiding information which is based on the submission information; a guiding information extraction unit that extracts the guiding information from the guiding information accumulation unit based on path information of the second moving object; and a guiding information transmission unit that transmits the guiding information extracted from the guiding information extraction unit to the second moving object. The guiding information extraction unit extracts the guiding information which corresponds to a predetermined guide point on a traveling route of the second moving object to the preset destination.

In the center server, the guiding information extraction unit extracts the guiding information which corresponds to the predetermined guide point on the traveling route of the second moving object to the preset destination from the guide information accumulation unit. The guiding information accumulated in the guiding information accumulation unit is the information which is based on the submission information submitted from the first moving object that is different from the second moving object in which the travel guiding is executed. That is, the guiding information used in the travel guiding in the second moving object is the information which is based on the submission information from the first moving object that actually travels along the road or the like. In this way, in the second moving object, it is possible to perform the easy-to-understand travel guiding for the driver of the second moving object.

An information processing device is mounted on a moving object and performs communication with a center server. The information processing device includes: a guiding information request unit that transmits information related to at least a destination to the center server, and makes a request for guiding information to the center server; and a travel guiding execution unit that executes a travel guiding for the moving object with respect to a traveling route to the destination. The guiding information request unit requests the guiding information which is based on the submission information submitted from another moving object. In a case where the guiding information is acquired, which corresponds to the predetermined guide point on the traveling route and which is based on the submission information, the travel guiding execution unit executes the travel guiding using the guiding information.

In the information processing device, the travel guiding execution unit executes the travel guiding using the guiding information acquired from the center server. The guiding information acquired from the center server is the information which is based on the submission information submitted from another moving object that is different from the moving object in which the travel guiding is executed. That is, the guiding information used in the travel guiding in the moving object is the information which is based on the submission information from another moving object that actually travels along the road or the like. In this way, in the moving object, it is possible to perform the easy-to-understand travel guiding for the driver of the moving object.

In addition, in a case where the guiding information cannot be acquired, which corresponds to the predetermined guide point on the traveling route and which is based on the submission information, the travel guiding execution unit executes the travel guiding using the guiding information provided in the travel guiding execution unit as standard data. In this way, it is possible to execute the travel guiding even with respect to the guide point in which the guiding information based on the submission information from another vehicle does not exist.

Another information processing device is mounted on a moving object and performs communication with a center server. The information processing device includes a submission information acquisition unit that acquires submission information related to a travel guiding and a submission information transmission unit that transmits travel trajectory information of the moving object in association with the submission information to the center server.

In the information processing device, the submission information transmission unit transmits the travel trajectory information of the moving object to the center server in association with the acquired submission information. If the guiding information based on the acquired submission information is accumulated in the center server, by transmitting the guiding information to another moving object which moves along the same travel trajectory, the guiding information can be used in the another moving object as the travel guiding. The guiding information is the information based on the submission information submitted from the another moving object that is different from the moving object in which the travel guiding is executed. That is, the guiding information used in the travel guiding in another moving object is the information based on the submission information from the moving object which actually travels on the road or the like. In this way, in another moving object, it is possible to perform the easy-to-understand travel guiding for the driver of the another moving object.

Advantageous Effects of Invention

According to the present invention, it is possible to perform an easy-to-understand travel guiding for a user.

BRIEF DESCRIPTION OF DRAWINGS

FIG. 9 is a diagram illustrating examples of situations in which the submission information can be effectively used.

DESCRIPTION OF EMBODIMENTS

Hereinafter, a preferred embodiment of an information processing system, an information processing device, and a center server will be described in detail with reference to the drawings.

Figure 1:
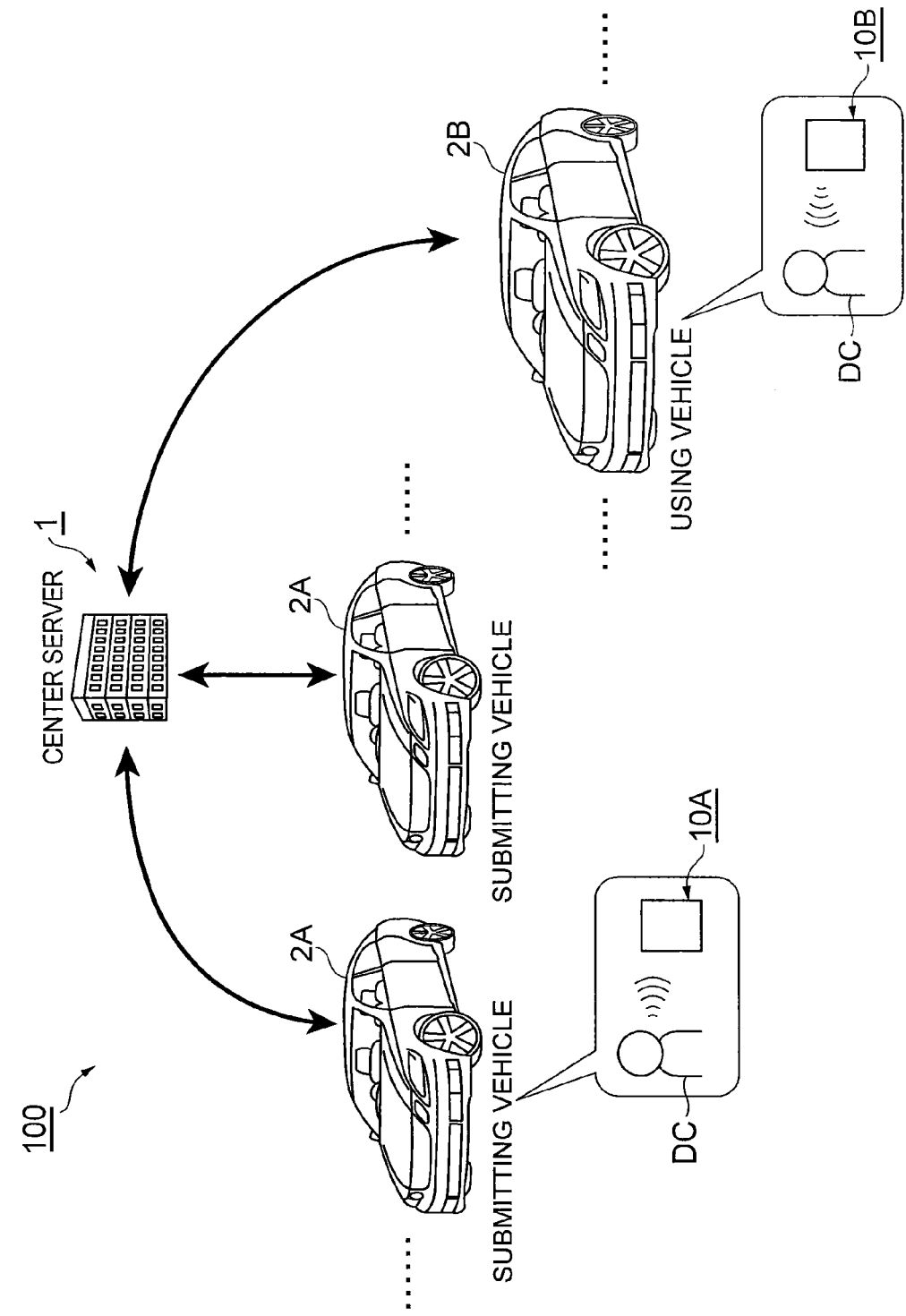
FIG. 1 is a diagram illustrating a configuration of an information processing system in the embodiment.
Figure 2:
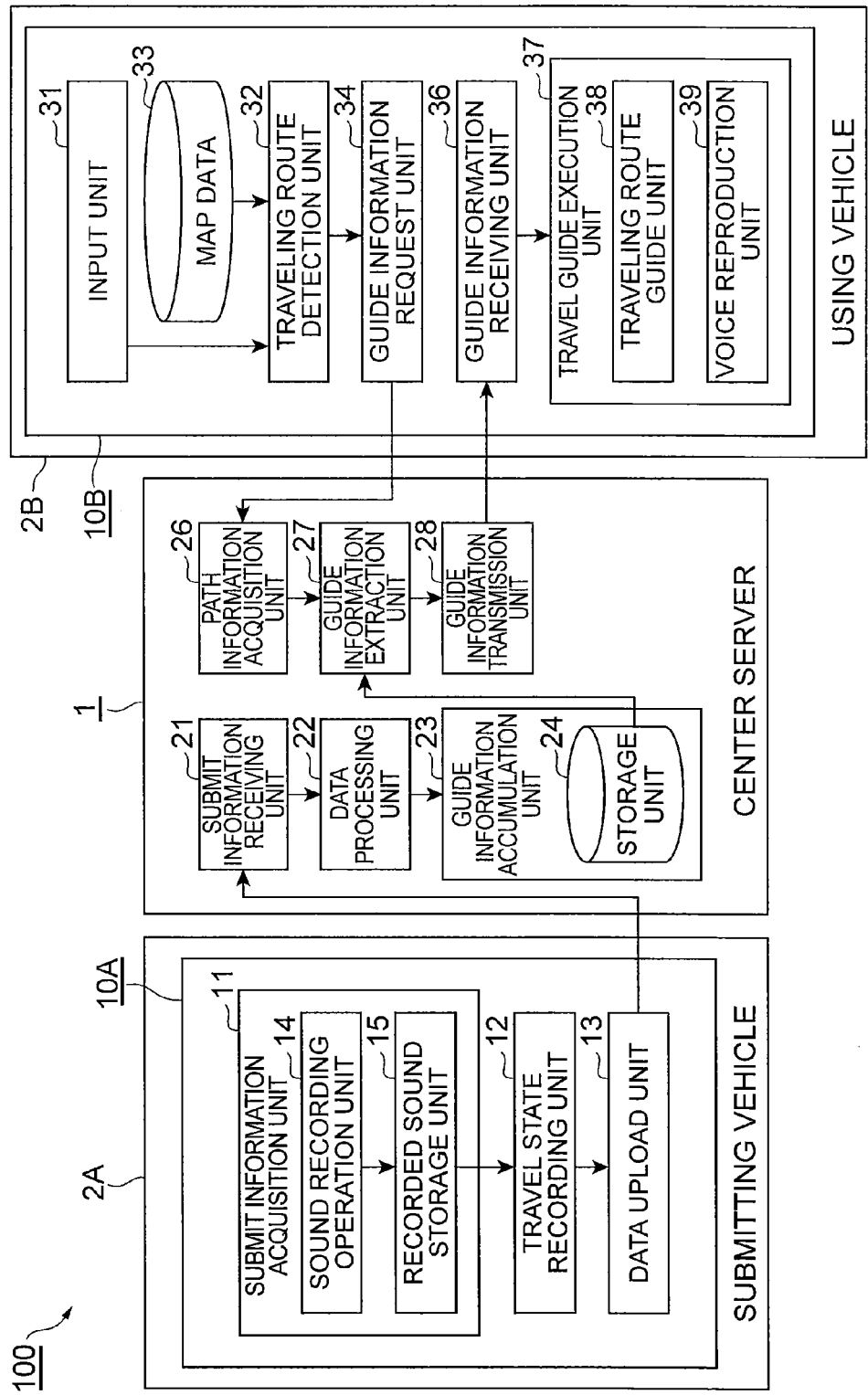
FIG. 2 is a configuration block diagram illustrating a configuration of an information processing system in the embodiment.

A configuration of an information processing system 100 in the embodiment will be described with reference to FIG. 1 and FIG. 2. As illustrated in FIG. 1, the information processing system 100 includes a center server 1, a submitting vehicle 2A that submits information, and a using vehicle 2B that uses the submitted information. The submitting vehicle 2A and the using vehicle 2B perform communication with the center server 1 respectively. Here, the using vehicle 2B can become a submitting vehicle, and the submitting vehicle 2A can become a using vehicle. A plurality of submitting vehicles 2A and using vehicles 2B exists, which can use the present system. Of course, one vehicle may submission information and also use information submitted from another vehicle (in addition, the submission information submitted from a host vehicle may be used). Moreover, in the embodiment, for the sake of understanding, a situation with an assumption that one using vehicle 2B uses the submission information submitted from a plurality of submitting vehicles 2A will be described. The submitting vehicle 2A includes an information processing device 10A that can communicate with the center server 1. The information processing device 10A at least has a function of acquiring the submission information related to a travel guiding from occupants (driver and passenger) DC of the submitting vehicle 2A. The information processing device 10A is not particularly limited as long as the information processing device 10A can at least communicate with the center server 1 and is a vehicle-mounted device that can acquire the submission information. A car navigation device, a smart phone or the like can be used as the information processing device 10A. The using vehicle 2B includes an information processing device 10B that can communicate with the center server 1. The information processing device 10B at least has a function of performing a travel guiding for the occupants (driver and passenger) DC of the using vehicle 2B. The information processing device 10B is not particularly limited as long as the information processing device 10B can at least communicate with the center server 1 and is a vehicle-mounted device that can perform the travel guiding. A car navigation device, a smart phone or the like can be used as the information processing device 10B.

The configuration of the information processing system 100 will be described in more detail with reference to FIG. 2. Here, since the using vehicle 2B can become the submitting vehicle 2A, and the submitting vehicle 2A can become the using vehicle 2B, the information processing device 10A in the submitting vehicle 2A and the information processing device 10B in the using vehicle 2B may have exactly the same configurations. However, in FIG. 2, for the sake of understanding, only the configuration for playing a role as the submitting vehicle 2A is illustrated, and only the configuration for playing a role as the using vehicle 2B is illustrated. As illustrated in FIG. 2, the information processing device 10A is mounted on the submitting vehicle 2A. The information processing device 10A includes a submission information acquisition unit 11, a travel state recording unit 12, and a data upload unit 13.

The submission information acquisition unit 11 has a function of acquiring the submission information related to the travel guiding from the occupants (driver and passenger) of the submitting vehicle 2A. The submission information is information that can guide the traveling when the vehicle travels toward a desired destination (specific examples will be described below). The form of the submission information is not particularly limited. The form of the submission information may be voice data acquired by recording a sound, data acquired by inputting characters, data acquired by a touch panel or a button operation, image data acquired by capturing an image, or the like.

In the embodiment, the voice data acquired by recording a sound is used as an example as a form of the submission information. Specifically, the submission information acquisition unit 11 includes a sound recording operation unit 14 and a recorded sound storage unit 15. The sound recording operation unit 14 is an interface that includes an operation unit for the occupants to perform a starting and stopping of recording, and a microphone or the like for acquiring the sound. Anything may be used as the sound recording operation unit 14 as long as it is possible to be operated by the occupants. A touch panel, and a button provided in the vehicle (for example, an operation button installed on the steering wheel) may be used. In addition, the microphone of the sound recording operation unit 14 may be provided in any place. The recorded sound storage unit 15 has a function of storing the voice data recorded by the occupants. The submission information acquisition unit 11 transmits the acquired submission information to the travel state recording unit 12.

The travel state recording unit 12 has a function of recording a travel state of the submitting vehicle 2A at the time when the submission information is acquired in the submission information acquisition unit 11. The travel state recording unit 12 has a function of, for example, recording a starting point of sound recording, a stopping point of sound recording, and travel trajectory information (that includes position information indicating at which position of the travel trajectory the voice data is recorded) of the submitting vehicle 2A at the time when the submission information is acquired. In addition, the travel state recording unit 12 may record, for example, the submission information and the time zone of acquiring the submission information, and the traffic state surrounding the vehicle. The travel state recording unit 12 transmits the recorded travel state to the data upload unit 13.

The data upload unit 13 functions as a submission information transmission unit that transmits the submission information to the center server 1 and uploads the submission information. In addition, the data upload unit 13 has a function of transmitting the information (including the travel trajectory information) related to the travel state of the submitting vehicle 2A to the center server 1 in association with the submission information. The details of the association will be described below.

The center server 1 includes a submission information receiving unit 21, a data processing unit 22, a guiding information accumulation unit 23, a storage unit 24, a path information acquisition unit 26, a guiding information extraction unit 27, and a guiding information transmission unit 28.

The submission information receiving unit 21 has a function of receiving the submission information transmitted from the submitting vehicle 2A. The submission information receiving unit 21 receives the submission information in association with the travel state. The submission information receiving unit 21 transmits the received submission information to a data processing unit 22.

The data processing unit 22 has a function of performing the data processing of the submission information received by the submission information receiving unit 21. In addition, the data processing unit 22 transmits the processed information to the guiding information accumulation unit 23 as the guiding information. The data processing unit 22 may perform the data processing on the submitted information in such a manner that the processed data can be easily used in the travel guiding for the using vehicle 2B (or in such a manner that the processed data can be easily extracted in the guiding information extraction unit 27). Alternatively, the data processing unit 22 may directly use the submitted information as the guiding information. The guiding information is the information generated based on the submission information submitted from the submitting vehicle 2A, and is the information for travel guiding and supporting the using vehicle 2B. The guiding information includes the content output from the using vehicle 2B and the information on the situation of such an output (for example, position information indicating at which position the guiding may be performed, or the like).

For example, in a case where the submission information is voice data, information in which the position information such as a place is associated with the voice data itself recorded in the submitting vehicle 2A may be used as the guiding information. In this case, the data processing unit 22 acquires the voice data itself recorded in the submitting vehicle 2A as a guiding voice for output, and also acquires the position information which is associated with the voice data based on the travel trajectory information of the submitting vehicle 2A. The data processing unit 22 acquires the guiding voice with which the position information is associated, as the guiding information. Alternatively, as the guiding information, other voice converted from the submitter or a voice on which noise canceling has been performed may be used. A voice that is translated to a foreign language, or voice data of which the content is processed (for example, voice data of which the unit is converted into miles from meters) may be used as the guiding information.

The guiding information accumulation unit 23 has a function of accumulating the guiding information which is based on the submission information. The guiding information accumulation unit 23 includes a storage unit 24, and the guiding information is accumulated in the storage unit 24. The guiding information accumulation unit 23 can respectively accumulate the guiding information obtained from a plurality of submitting vehicles 2A, and also can respectively accumulate the guiding information obtained in a plurality of times from one submitting vehicle 2A.

The path information acquisition unit 26 has a function of acquiring path information of the using vehicle 2B. The path information includes information on a departure place (the current position when setting a route), a destination, and a travel route, and the like of the using vehicle 2B. In addition, the path information may include information related to the time zone or the traffic state. The path information acquisition unit 26 transmits the path information to the guiding information extraction unit 27.

The guiding information extraction unit 27 has a function of extracting the guiding information from the storage unit 24 of the guiding information accumulation unit 23 based on the path information of the using vehicle 2B. The guiding information extraction unit 27 has a function of extracting the guiding information which corresponds to a predetermined guide point for the traveling route of the using vehicle 2B to the preset destination. That is, the guiding information extraction unit 27 detects whether the guiding information that can be used in the travel guiding at any of the guide points (for example, an intersection, or the like) on the traveling route of the using vehicle 2B, is accumulated in the storage unit 24 or not. In a case where the guiding information that can be used is present, the guiding information extraction unit 27 extracts the guiding information. More specifically, the guiding information extraction unit 27 has a function of extracting the guiding information by comparing the path information of the using vehicle 2B with the travel trajectory information of the submitting vehicle 2A in association with the submission information. Here, the travel trajectory information of the submitting vehicle 2A is accumulated in the storage unit 24 as the position information which is included in the guiding information. Therefore, the guiding information extraction unit 27 can detect whether the guiding information that can be used in the traveling route is present or not by comparing the traveling route included in the path information of the using vehicle 2B with the position information included in the guiding information.

In a case where guide points are present at a plurality of positions on the traveling route, the guiding information extraction unit 27 can extract the guiding information that corresponds to each guide point. The guiding information extraction unit 27 transmits the extracted guiding information to the guiding information transmission unit 28. The guiding information transmission unit 28 outputs the guiding information extracted from the guiding information extraction unit 27 to the using vehicle 2B. Moreover, in a case where the guiding information that can be used is not present in the traveling route, that effect is transmitted to the using vehicle 2B via the guiding information transmission unit 28.

The information processing device 10B is mounted on the using vehicle 2B. The information processing device 10B includes an input unit 31, a traveling route detection unit 32, map data 33, a guiding information request unit 34, a guiding information receiving unit 36, and a travel guiding execution unit 37.

The input unit 31 is an interface to which the occupants (the driver and the passenger) of the using vehicle 2B can input a variety of information. Through the input unit 31, the destination of the using vehicle 2B can be input, and other information necessary for the route guidance can be input. In addition, with the input unit 31, the selection can be performed of whether the submitted guiding information from other vehicle (the submitting vehicle 2A) is used or not. The information input through the input unit 31 is transmitted to the traveling route detection unit 32.

The traveling route detection unit 32 has a function of detecting the traveling route of the using vehicle 2B using the map data 33 based on at least the current position and the destination of the using vehicle 2B. When the traveling route is determined, the traveling route detection unit 32 transmits the path information that includes the traveling route, the destination, the departure place, and the like to the guiding information request unit 34. The guiding information request unit 34 has functions of transmitting the path information to the path information acquisition unit 26 of the center server 1, and making a request for the guiding information to the center server 1. The guiding information receiving unit 36 has a function of receiving the guiding information from the center server 1. The guiding information receiving unit 36 transmits the received guiding information to the travel guiding execution unit 37.

The travel guiding execution unit 37 has a function of executing the travel guiding of the using vehicle 2B with respect to the traveling route to the preset destination. The travel guiding execution unit 37 has a function of executing the travel guiding using the guiding information from the guiding information accumulation unit 23 of the center server 1. In a case where the guiding information that corresponds to the predetermined guide point on the traveling route can be acquired from the center server 1 (that is, the guiding information that corresponds to the guide point is present in the center server 1), the travel guiding execution unit 37 has a function of executing the travel guiding using the guiding information. On the other hand, in a case where the guiding information cannot be acquired from the center server 1 and in a case where the travel guiding execution unit 37 includes guiding information (which is not the information submitted from another vehicle) as standard data, the travel guiding execution unit 37 executes the travel guiding using the standard data. The travel guiding execution unit 37 includes a traveling route guiding unit 38 that performs the guiding of the traveling route, and a voice reproduction unit 39 that reproduces the voice data for the travel guiding. The traveling route guiding unit 38 is configured to include a display or the like that displays the travel route or the like with respect to the driver. The voice reproduction unit 39 is configured to include a speaker or the like that generates the voice with respect to the driver.

Next, an example of the information processing of the information processing system 100 in the embodiment will be described with reference to FIG. 3 to FIG. 8. The below-described example is an example of processing in a case where the voice data is submitted as the submission information.

Figure 3:
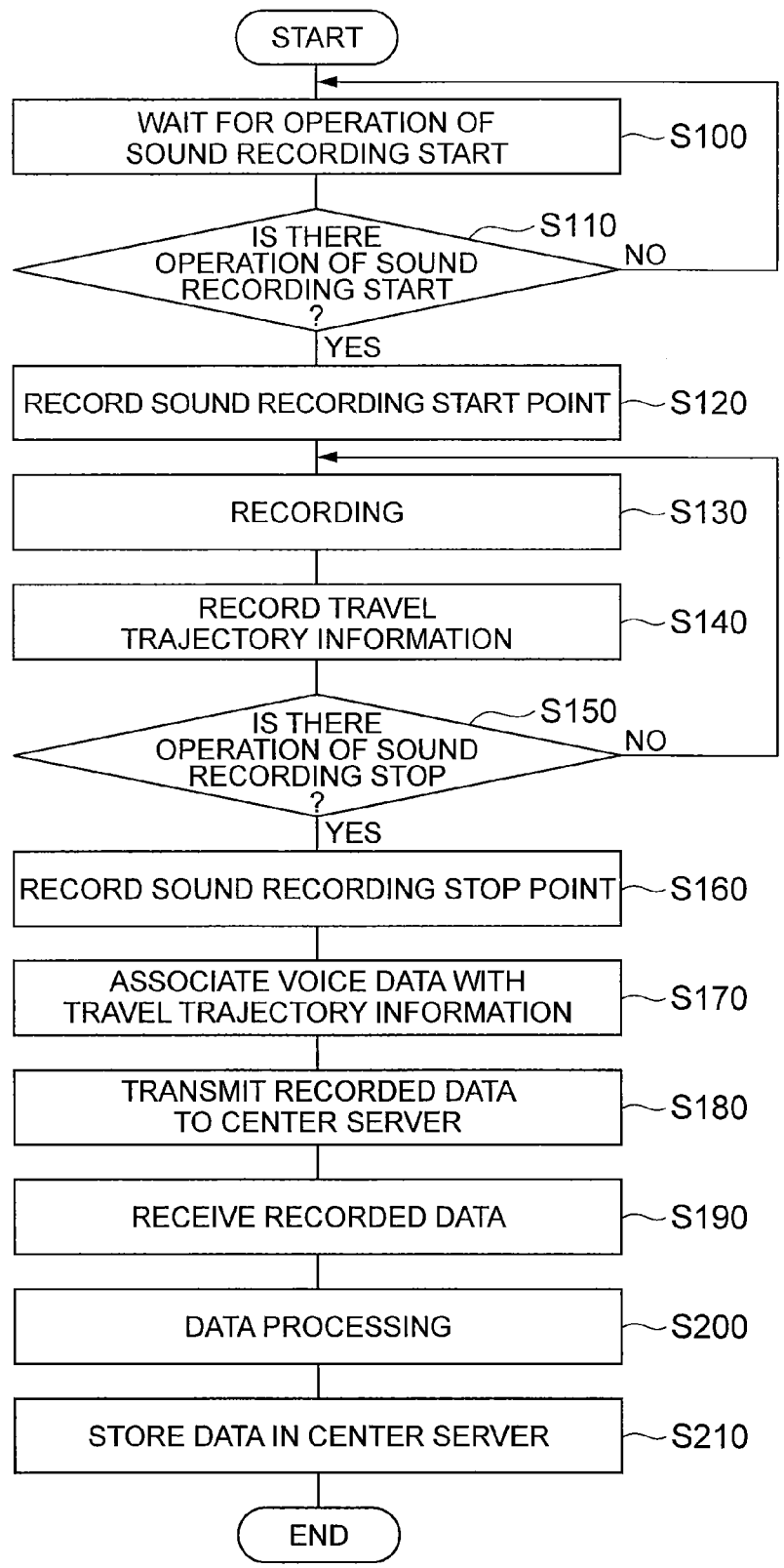
FIG. 3 is a flow chart illustrating an example of processing when a submitting vehicle submits submission information to a center server.
Figure 6:
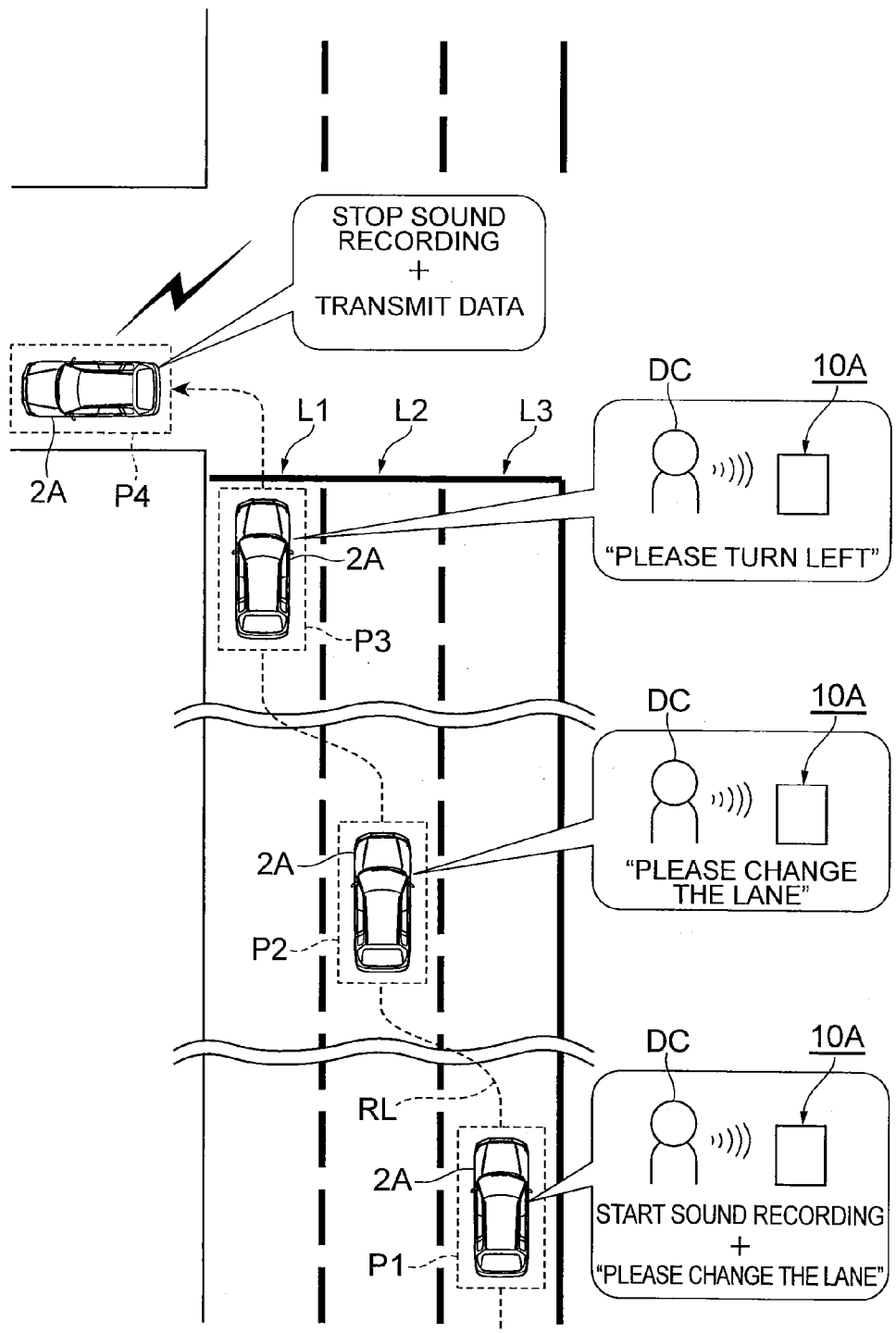
FIG. 6 illustrates an example of an aspect in which a submitting vehicle acquires submission information and submits the submission information to the center server.

First, the processing in a case where the submitting vehicle 2A submits the submission information to the center server 1 will be described. FIG. 3 is a flow chart illustrating an example of the processing when the submitting vehicle 2A submits the submission information to the center server 1. The processing in FIG. 3 is repeatedly performed during the traveling of the submitting vehicle 2A. In addition, FIG. 6 illustrates an example of the way the submitting vehicle 2A acquires the submission information (recording the voice data) and submits the submission information to the center server 1. FIG. 6 illustrates an example of the way the submission information is submitted in a case where the submitting vehicle 2A turns left at the intersection. The occupants DC of the submitting vehicle 2A illustrated in FIG. 6 are familiar with the situation of the intersection, and know that it is better to change lane earlier since the traffic is very congested immediately in front of the intersection. Specifically, at the beginning, the submitting vehicle 2A travels in the third lane L3. The occupant DC of the submitting vehicle 2A knows that he has to change lane earlier. Therefore, the occupant DC performs the sound recording start operation at the position P1 significantly in front of the intersection, and for example, utters a speech saying "Please change lane". Then, the occupant DC changes lane to the second lane L2. In addition, when the occupant DC approaches further to the intersection, and determines that it is better to travel in the first lane L1 which is a left turn lane in advance, the occupant DC utters a speech saying "Please change lane" at the position P2. Then, the occupant DC changes the lane to the second lane L2. In addition, when the submitting vehicle 2A turns left, the occupant DC utters a speech saying "Please turn left" at the position P3. When the left turn is finished, the occupant DC stops recording the sound at the position P4. Later on, this example will be described comparing with the flow chart illustrated in FIG. 3.

As illustrated FIG. 3, the submission information acquisition unit 11 of the information processing device 10A in the submitting vehicle 2A is in a waiting state for the sound recording start operation (STEP S100). S100 is a state of waiting for the sound recording start operation by the occupant of the submitting vehicle 2A. In addition, the submission information acquisition unit 11 performs the determination of whether there is the sound recording start operation or not (STEP S110). In a case where the occupant of the submitting vehicle 2A expresses the intention of starting the sound recording by operating the sound recording operation unit 14, the submission information acquisition unit 11 determines that there is the sound recording start operation. The form of the sound recording start operation is not particularly limited. The starting of the sound recording may be operated by pressing a button or switch provided on the predetermined position in the vehicle or on the display, or by voice recognition (for example, the start of operation may be triggered by a speech saying "sound recording is started") or the like. In a case where it is determined that there is no sound recording start operation, the process returns to the state of waiting for the sound recording start operation.

In a case where it is determined that there is the sound recording start operation in STEP S110, the travel state recording unit 12 of the submitting vehicle 2A specifies the sound recording start point, and records the sound recording start point (STEP S120). In the example in FIG. 6, the occupant DC performs the starting sound recording at the position P1. Therefore, the travel state recording unit 12 records the position P1 as the sound recording start point.

When the sound recording is started, the recorded sound storage unit 15 of the submission information acquisition unit 11 records the voice of the occupant DC as the submission information (STEP S130). In addition, the travel state recording unit 12 records the travel trajectory information (STEP S140). At this time, in addition to the travel trajectory information, information such as the time zone, and the traffic situation may be recorded. In addition, the submission information acquisition unit 11 determines whether there is a sound recording stop operation or not (STEP S150). In S150, in a case where it is determined that there is no sound recording stop operation, the process is repeated from S130 again.

In the example in FIG. 6, when the submitting vehicle 2A is present at the position P1, the recorded sound storage unit 15 records the voice saying "Please change lane". The travel state recording unit 12 records the travel trajectory information at that time (here, the position information at the position P1). When the submitting vehicle 2A is present at the position P2, the recorded sound storage unit 15 records the speech saying "Please change lane". The travel state recording unit 12 records the travel trajectory information at that time (here, the position information at the position P2). When the submitting vehicle 2A is present at the position P3, the recorded sound storage unit 15 records the speech saying "Please turn left". The travel state recording unit 12 records the travel trajectory information at that time (here, the position information at the position P3). Moreover, in a space between the position P1 at which the first voice data is recorded and the position P2 at which the second voice data is recorded, a noise (a noise on the road, a dialogue in the vehicle, or the like) is recorded, and the travel trajectory information is recorded, which is related to the travel trajectory RL of changing lane from the third lane L3 to the second lane L2. However, in a case where it can be apparently determined that it is not the voice data related to the travel guiding, the sound recording or the recording of the travel trajectory information may be temporarily stopped. Alternatively, when the submission information is transmitted to the center server 1, such voice data and the travel trajectory information may be excluded. Alternatively, such voice data and the travel trajectory information may be excluded in the data processing unit 22 of the center server 1.

In S150, in a case where it is determined that there is the sound recording stop operation, the travel state recording unit 12 specifies the sound recording stop point, and records the sound recording stop point (STEP S160). In the travel state recording unit 12, the performing of the same operation as the sound recording start by the occupant DC may be used as the sound recording start operation, or by detecting the action being finished (left turn is finished), it may automatically be considered that there is the sound recording stop operation. In the example in FIG. 6, the occupant DC performs the sound recording stop operation at the position P4. Therefore, the travel state recording unit 12 records the position P4 as the sound recording stop point.

The data upload unit 13 associates the voice data acquired from the process in S120 to S160 (submission information) and the travel trajectory information (STEP S170) with each other. In the example in FIG. 6, for example, the data upload unit 13 associates the voice data of the first sound recording with the position information of the position P1, associates the voice data of the second sound recording with the position information of the position P2, and associates the voice data of the third sound recording with the position information of the position P3. In addition, the data upload unit 13 associates the position information of the sound recording start position P1 and the position information of the sound recording stop position P4 with each of the voice data items. In this way, the data upload unit 13 generates a set of recorded data that includes three voice data items from the sound recording start position P1 to the sound recording stop position P4.

The data upload unit 13 transmits the recorded data generated in S170 to the center server 1 (STEP S180). On the other hand, the submission information receiving unit 21 of the center server 1 receives the recorded data that includes the voice data (submission information) (STEP S190).

The data processing unit 22 of the center server 1 executes the data processing of the recorded data received in S190 (STEP S200). In this way, the data processing unit 22 generates the guiding information that can be used by the using vehicle 2B. The data processing unit 22 may directly use the recorded data from the submitting vehicle 2A as the guiding information, or may generate the guiding information by performing editing and processing of the recorded data. In the example in FIG. 6, the guiding information includes at least the voice data which is associated with the position information of the position P1 (or the edited and processed voice data), the voice data which is associated with the position information of the position P2 (or the edited and processed voice data), the voice data which is associated with the position information of the position P3 (or the edited and processed voice data), and the position information of the sound recording start position P1 and the sound recording stop position P4.

The guiding information accumulation unit 23 of the center server 1 stores and accumulates the guiding information generated in S200 in the storage unit 24 (STEP S210). In the example in FIG. 6, the guiding information accumulation unit 23 accumulates the guiding information as the guiding information in the interval from the sound recording start position P1 to the sound recording stop position P4. In the process described above, the processing in FIG. 3 ends, and starts again from S100. Of course, the guiding information accumulation unit 23 can accumulate guiding information of another position, or guiding information from another submitting vehicle 2A regarding the same position (or, information may be obtained many times by the same submitting vehicle 2A at the same position).

Figure 4:
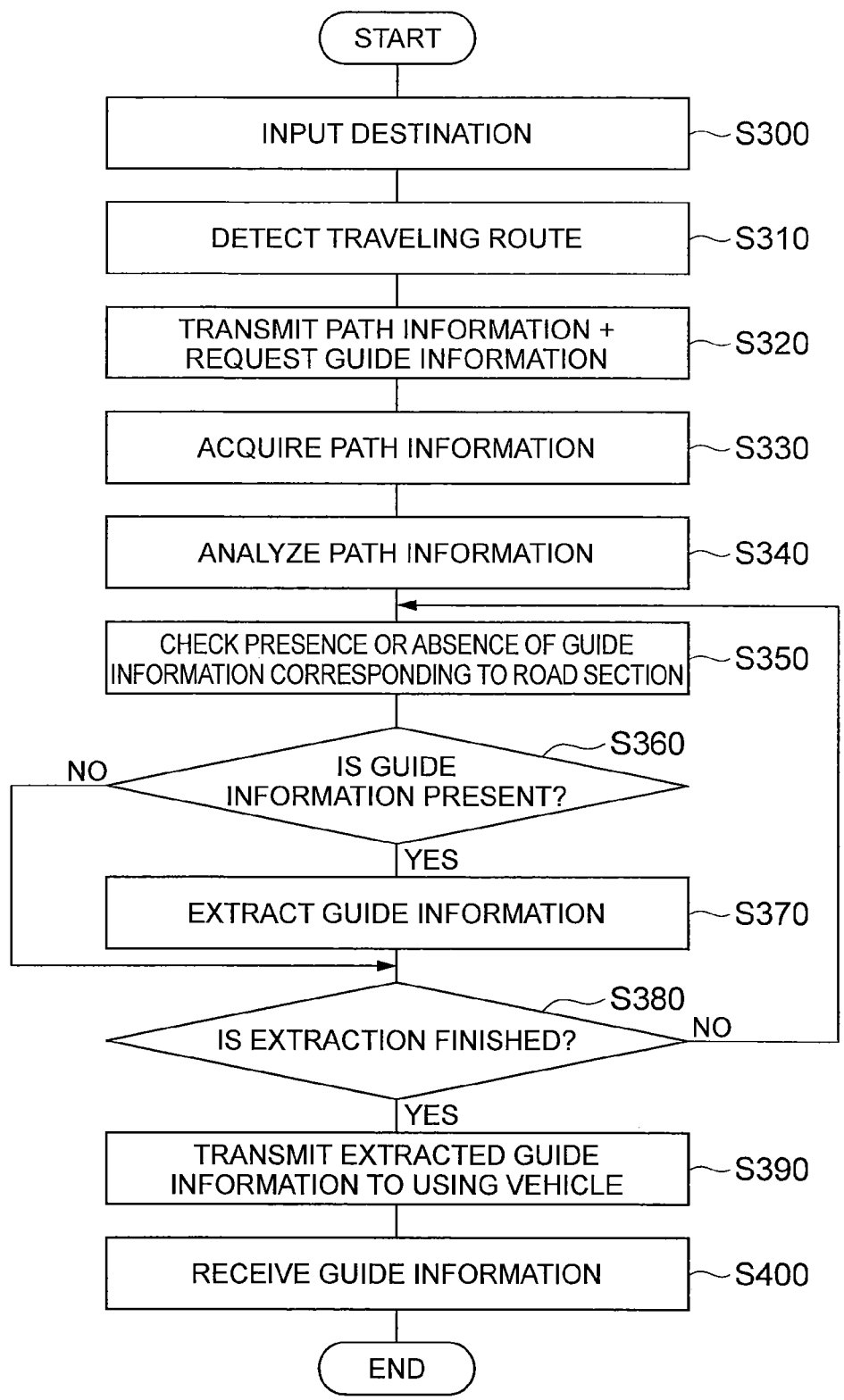
FIG. 4 is a flow chart illustrating an example of processing in a case where a center server extracts guiding information and transmits the guiding information to a using vehicle.
Figure 8:
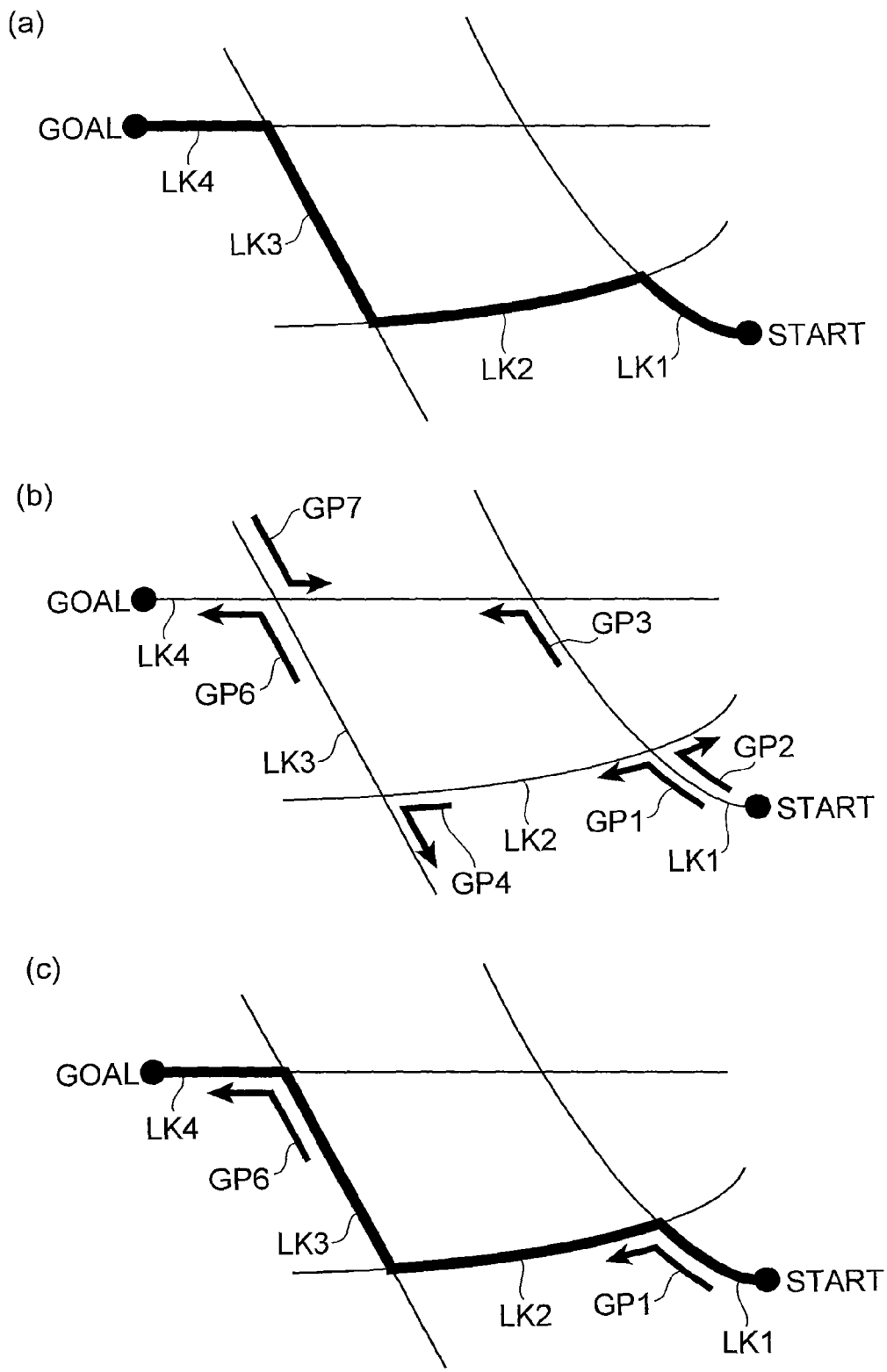
FIG. 8 is a diagram for explaining a processing content of the extraction of the guiding information from the center server.

Next, processing in a case where the center server 1 extracts the guiding information and transmits the guiding information to the using vehicle 2B will be described. FIG. 4 is a flow chart illustrating an example of the processing in a case where the center server 1 extracts the guiding information and transmits the guiding information to the using vehicle 2B. The processing in FIG. 4 is executed when the using vehicle 2B performs the setting of the traveling route. In addition, FIG. 8 is a diagram for explaining the processing content of extraction of the guiding information from the center server 1. FIG. 8 illustrates an example of traveling route along which the using vehicle 2B travels.

As illustrated in FIG. 4, the using vehicle 2B acquires the destination of the using vehicle 2B based on the input operation through the input unit 31 (STEP S300). The traveling route detection unit 32 detects the traveling route of the using vehicle 2B based on the map data 33 and the destination input in S300 (STEP S310). The traveling route detection unit 32 detects the traveling route toward the destination from the map data 33 with the current position of the using vehicle 2B being the departure position. The traveling route may be determined by any method, for example, the shortest route may be selected, a route which has a least number of right or left turns may be selected, or a route where the submitted guiding information can be utilized most may be selected.

The guiding information request unit 34 transmits the path information of the using vehicle 2B and makes a request for the guiding information to the center server 1 (STEP S320). The path information acquisition unit 26 of the center server 1 acquires the path information from the using vehicle 2B (STEP S330). In addition, the guiding information extraction unit 27 performs the analyzing of the path information acquired in S330 in order to extract the guiding information (STEP S340). In S340, the guiding information extraction unit 27 specifies the guide point in the traveling route by analyzing the traveling route of the using vehicle 2B (for example, figures out on which intersection the vehicle will turn right or left). For example, the guiding information extraction unit 27 may perform the analyzing by dividing the traveling route into a plurality of road sections (for example, dividing the route such that a link in the traveling route becomes one section of the road). Moreover, in the subsequent STEPS S350 to S380, among the plurality of road sections included in the traveling route, the processing is performed by taking the road sections out one by one.

Next, regarding the road section subject to the determination, the guiding information extraction unit 27 performs checking of whether or not the guiding information which corresponds to the road section is present in the guiding information accumulation unit 23 (STEP S350), and determines whether there is the guiding information or not (STEP S360). In S360, in a case where it is determined that there is the guiding information, the guiding information extraction unit 27 extracts the guiding information (STEP S370). The guiding information extraction unit 27 determines whether the extraction regarding all the road sections is finished or not (STEP S380). In a case where there are road sections in which the processing is not performed, the processing in S350 to S370 is repeated for the next road section. On the other hand, in a case where it is determined that there is no guiding information, the extraction of the guiding information for the road section is not performed, and the process proceeds to S380.

An example of the processing in S330 to S380 will be described in detail using the example in FIG. 8. First, in S330, the path information acquisition unit 26 acquires the path information such as illustrated in FIG. 8(a). In S340, the guiding information extraction unit 27 analyzes the path information, and figures out that the using vehicle 2B departs from the departure position "START" and passes through the road section (link) LK1, turns left and passes through the road section (link) LK2, turns right and passes through the road section (link) LK3, turns left and passes through the road section (link) LK4, and then arrives at the "GOAL". In this case, the guiding information extraction unit 27 figures out the front of the intersection between the road section LK1 and the road section LK2, the front of the intersection between the road section LK2 and the road section LK3, and the front of the intersection between the road section LK3 and the road section LK4 as the guide points.

Here, the storage unit 24 of the guiding information accumulation unit 23 has guiding information GP1 to GP7 as illustrated in FIG. 8(b). The guiding information GP1 to GP7 is the guiding information generated based on the information submitted from the submitting vehicle 2A. On the other hand, the guiding information extracted with respect to the traveling route is illustrated in FIG. 8(c).

The guiding information extraction unit 27 executes the process of S350 to S380 in an order of the road sections LK1, LK2, LK3, and LK4 from the "START" toward the "GOAL". However, the order is not particularly limited. The guiding information extraction unit 27 performs the extraction processing of the guiding information regarding the road section LK1. As illustrated in FIG. 8(b), the guiding information accumulation unit 23 has guiding information GP1 for left turn and guiding information GP2 for right turn, in front of the intersection of the road section LK1 (between the road sections LK1 and LK2). In the travel guiding of this time, only the guiding information GP1 for left turn is used. The guiding information extraction unit 27 determines that there is the guiding information corresponding to the road section LK1, and extracts the guiding information GP1 as illustrated in FIG. 8(c). Since the extraction processing for all the road sections is not finished, the guiding information extraction unit 27 moves to the extraction processing regarding the next road section LK2.

Furthermore, in a case where there is a plurality of guiding information items GP1, any one of the guiding information items is selected and extracted. In a case where there is submission from a plurality of submitting vehicles 2A with respect to one guide point (or one action) (or in a case where there is a plurality of submissions from one submitting vehicle 2A), there is thus a plurality of guiding information items. In this case, the guiding information extraction unit 27 can select one guiding information item by a predetermined determination method. For example, the guiding information may be selected by the center server 1 side, or may be selected based on the selection conditions set by the occupant of the using vehicle 2B.

As illustrated in FIG. 8(b), the guiding information accumulation unit 23, in front of the intersection (between LK2 and LK3) of the road section LK2, only has guiding information GP4 for the left turn. In the travel guiding of this time, despite that the guiding information for the right turn is needed, there is only the guiding information GP4 for the left turn. The guiding information extraction unit 27 determines that there is no guiding information which corresponds to the road section LK2, and does not extract the guiding information as illustrated in FIG. 8(c). Since the extraction processing for all the road sections is not finished, the guiding information extraction unit 27 moves to the extraction processing regarding the next road section LK3.

As illustrated in FIG. 8(b), the guiding information accumulation unit 23, in front of the intersection (between LK3 and LK4) of the road section LK3, only has guiding information GP6 for the left turn. In the travel guiding of this time, the guiding information for the left turn is needed. The guiding information extraction unit 27 determines that there is the guiding information which corresponds to the road section LK3, and extracts the guiding information GP6 as illustrated in FIG. 8(c). Since the extraction processing for all the road sections is not finished, the guiding information extraction unit 27 moves to the extraction processing regarding the next road section LK4. In the road section LK4, there is no particular intersection, thus, the vehicle arrives at the destination "GOAL" by merely traveling straight forward. Therefore, there is no guiding information and the guiding information extraction unit 27 does not extract the guiding information. When the extraction regarding road section LK4 is finished, the extraction processing regarding all the road sections is finished. In the example here, the guiding information GP2, GP3, GP4, and GP7 is not extracted. However, in a case where another traveling route is set, the guiding information GP2, GP3, GP4, and GP7 may be used.

Referring back to FIG. 4, in a case where it is determined that the extraction processing in S380 is finished, the guiding information transmission unit 28 transmits the extracted guiding information to the using vehicle 2B (STEP S390). Then, the guiding information receiving unit 36 of the using vehicle 2B receives the guiding information (STEP S400). In the example in FIG. 8, the guiding information transmission unit 28 transmits the guiding information GP1 and GP6 as illustrated in FIG. 8(c). As described above, the processing in FIG. 4 ends. When the same or another using vehicle 2B performs the setting of the traveling route, the process starts again from S300.

Figure 5:
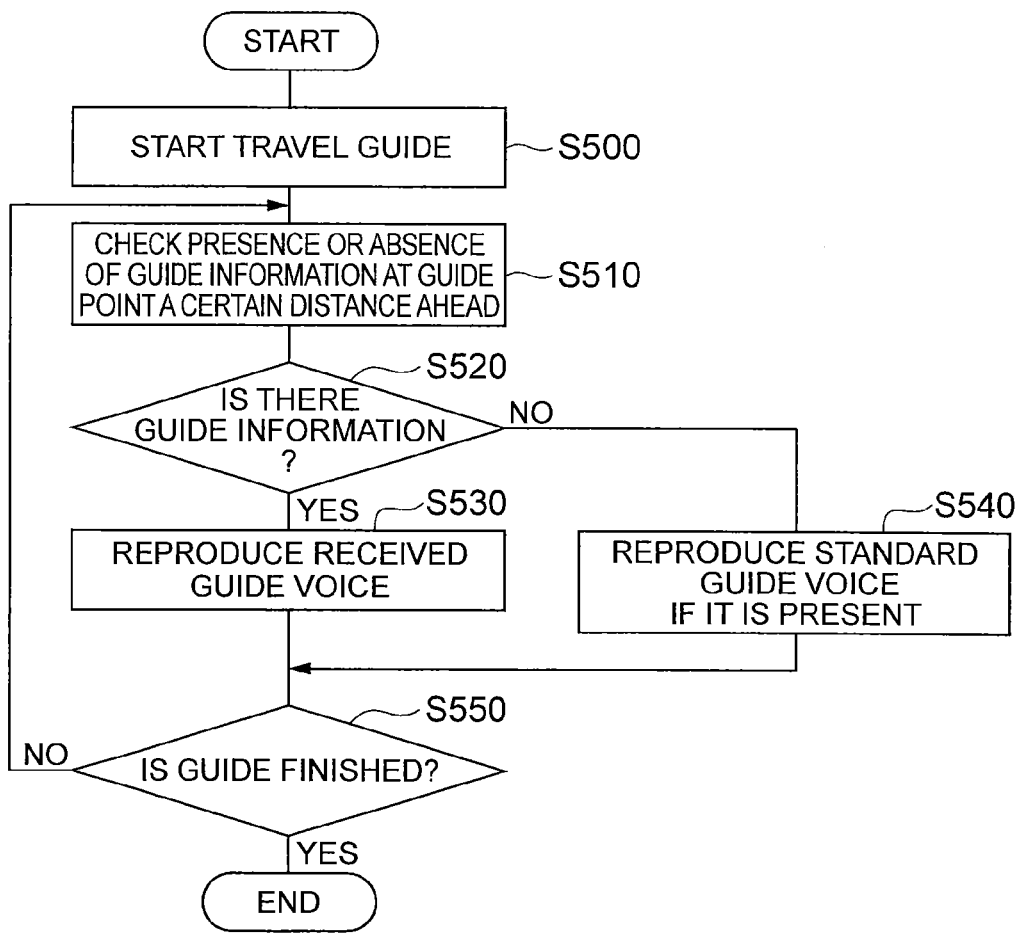
FIG. 5 is a flow chart illustrating an example of processing in a case where an information processing device performs a travel guiding on the using vehicle.
Figure 7:
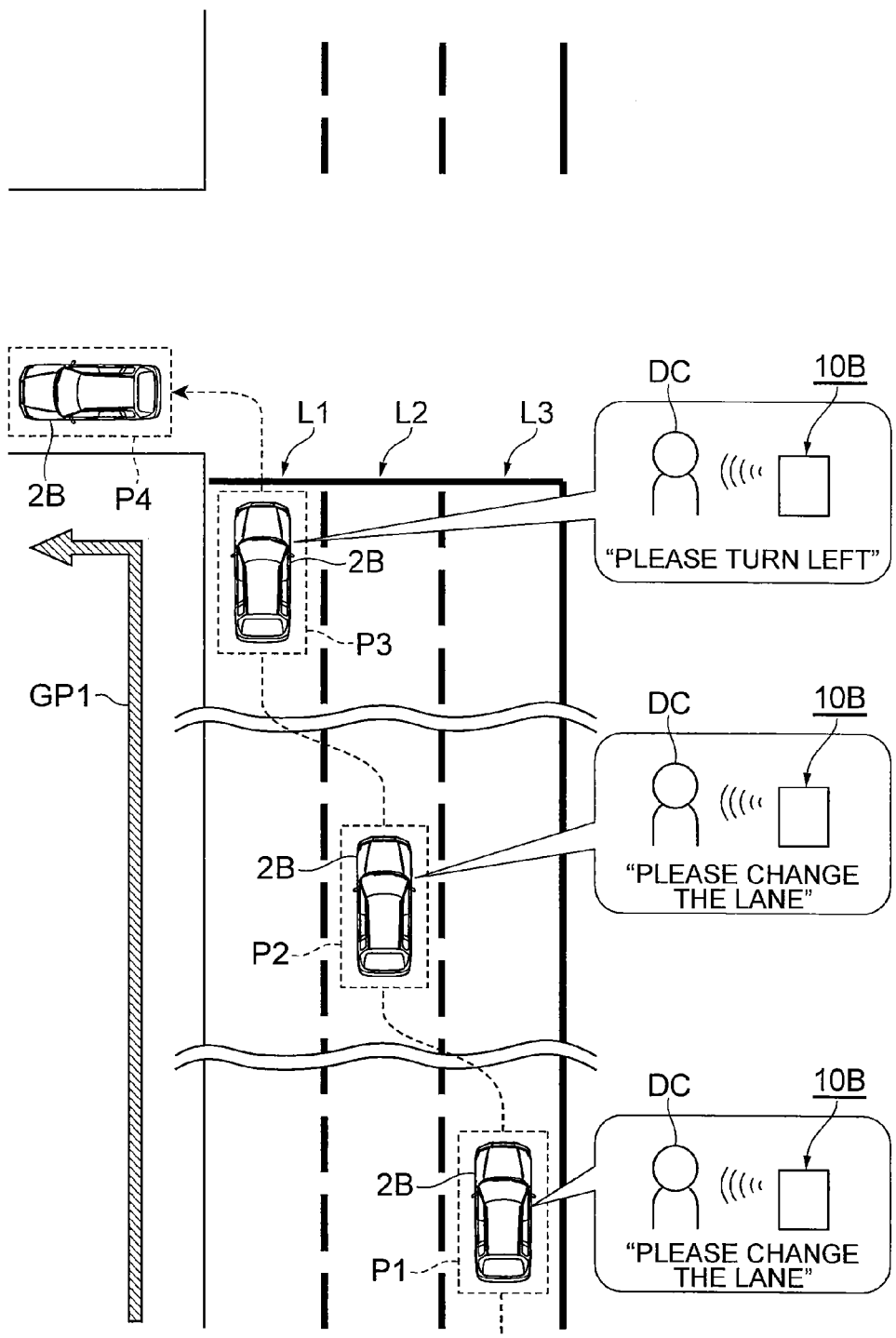
FIG. 7 illustrates an example of an aspect in which the travel guiding of the using vehicle is performed using the guiding information which is based on the submission information illustrated in FIG. 6.

Next, processing in a case where the information processing device 10B performs the travel guiding on the using vehicle 2B using the guiding information will be described. FIG. 5 is a flow chart illustrating an example of the processing in a case where the information processing device 10B performs the travel guiding on the using vehicle 2B. The processing in FIG. 5 is executed when the information processing device 10B performs the travel guiding on the using vehicle 2B after receiving the guiding information from the center server 1. In addition, FIG. 7 illustrates an example of an aspect of performing the travel guiding on the using vehicle 2B using the guiding information based on the submission information illustrated in FIG. 6. FIG. 7 illustrates an example of an aspect of using the guiding information GP1 extracted in FIG. 8 in a case where the using vehicle 2B turns left at the intersection.

As illustrated in FIG. 5, the travel guiding execution unit 37 of the information processing device 10B in the using vehicle 2B starts the travel guiding for the using vehicle 2B (STEP S500). Specifically, the traveling route guiding unit 38 of the travel guiding execution unit 37 performs the guiding for the traveling route. The traveling route guiding unit 38 performs the guiding such that the using vehicle travels along the traveling route from the departure point "START" toward the destination "GOAL" as illustrated in FIG. 8(c).

The travel guiding execution unit 37 checks for the presence or absence of the guiding information at the guide point a certain distance ahead from the current position (STEP S510). Specifically, the travel guiding execution unit 37 checks for the presence or absence of the guiding information extracted in S370 in FIG. 4, at the guide point a certain distance ahead from the current position of the using vehicle 2B. The travel guiding execution unit 37 determines whether there is the guiding information at that guide point or not based on the result of checking in S510 (STEP S520). In a case where it is determined in S520 that there is the guiding information, the voice reproduction unit 39 of the travel guiding execution unit 37 executes the travel guiding by reproducing the guiding voice which is based on the guiding information at the guide point received from the center server 1 (STEP S530). On the other hand, in a case where it is determined in S520 that there is no guiding information, the voice reproduction unit 39 of the travel guiding execution unit 37 reproduces a standard guiding voice if the standard guiding voice is present (S540). The standard guiding voice is an existing guiding voice that is originally provided in the travel guiding execution unit 37 of the information processing device 10B as standard data, and is not the guiding voice based on the submission from the submitting vehicle 2A. In a case where the standard guiding voice is not present, the voice reproduction unit 39 does not perform the voice guiding. When the processing in S530 or S540 is finished, the travel guiding execution unit 37 determines whether the guiding for the traveling route is finished or not (STEP SS550). That is, the travel guiding execution unit 37 determines whether the using vehicle 2B has arrived at the destination or not. In S550, in a case where it is determined that the guiding is not finished, the processing is repeated again from S510. On the other hand, in S550, in a case where it is determined that the guiding is finished, the processing in FIG. 5 ends. When the next travel guiding is started, the processing is executed again from S500.

An example of the processing in FIG. 5 will be described using FIG. 7 and FIG. 8(c). First, the using vehicle 2B starts from the departure point "START" and travels along the road section LK1. In S510, the travel guiding execution unit 37 checks for the presence or absence of the guiding information regarding the intersection (between LK1 and LK2) which is the guide point a certain distance ahead. In S520, since there is the guiding information GP1 at the intersection, the travel guiding execution unit 37 determines that "there is the guiding information".

In S530, when the using vehicle 2B approaches the intersection, the voice reproduction unit 39 reproduces the guiding voice based on the guiding information GP1. As illustrated in FIG. 7, the guiding information GP1 is based on the sound recording in the submitting vehicle 2A in FIG. 6, and has three voice data items in the route from the sound recording start position P1 to the sound recording stop position P4. First, when the using vehicle 2B arrives at the position P1, the voice reproduction unit 39 reproduces the speech saying "please change lane" to the occupant DC. Similarly, the voice reproduction unit 39 reproduces the speech saying "please change lane" at the position P2, and reproduces the speech saying "please turn left" at the position P3.

Furthermore, the travel trajectory of the using vehicle 2B may be determined in detail so as to correspond to the travel trajectory information of the submitting vehicle 2A, or may be determined roughly. Specifically, the travel guiding execution unit 37 may reproduce the guiding voice with considering in which lane the using vehicle 2B exists. In addition, the travel guiding execution unit 37 may reproduce the guiding voice with only considering how many meters in front of the intersection the using vehicle 2B exists without considering the lane. In a case where the lane is included in consideration, for example, in a case where the using vehicle 2B is already traveling in the second lane L2 and passes the position P1 on the third lane L3 where speech is recorded at the first time, the voice reproduction unit 39 may omit reproducing the first time guiding voice. In this way, an unnecessary guiding can be excluded, and it is possible to perform the guiding that is in-line with the actual travel state of the using vehicle 2B. In a case where the voice lane is not included in consideration, regardless of the state of which lane the using vehicle 2B travels in, if the using vehicle 2B reaches the position in front of the intersection at the same distance as the position P1 seen from the intersection, the voice reproduction unit 39 reproduces the guiding voice. That is, even though the using vehicle 2B travels in the first lane L1 or the second lane L2, the voice reproduction unit 39 reproduces the speech of first time. Moreover, in a case of such processing, the data processing unit 22 may edit the speech of first time as "if you are in the third lane, please change lane". In this way, it is possible to decrease the load of operation in the system.

In addition, not only the travel trajectory of the using vehicle 2B, but also other factors may be considered. For example, the travel guiding execution unit 37 may consider the time zone or traffic information. For example, the travel guiding execution unit 37 may omit the reproduction of the guiding voice in a case where the current situation is largely different from the situation of the submitting vehicle 2A which is the origin of the guiding information GP1 (for example, a case where the time when the submitting vehicle 2A records the sound is the day time with traffic jams, but the time when the using vehicle 2B travels is early in the morning without the traffic jams). In addition, the extraction in the step of extracting the guiding information from the center server 1 may be omitted.

In FIG. 8(c), when the using vehicle 2B turns left at the intersection of the road section LK1 and travels along the road section LK2, the travel guiding execution unit 37 checks for the presence or absence of the guiding information with regard to the intersection (between LK2 and LK3) which is the guide point a certain distance ahead from the vehicle. In S520, since guiding information is not present on the intersection, the travel guiding execution unit 37 determines that "there is no guiding information". In S540, in a case where the standard guiding voice is provided with respect to the intersection, the travel guiding execution unit 37 reproduces the standard guiding voice. In a case where the standard guiding voice is not provided, the travel guiding execution unit 37 does not reproduce the guiding voice. When the using vehicle 2B turns left at the intersection of the road section LK2 and travels along the road section LK3, the travel guiding execution unit 37 checks for the presence or absence of the guiding information with regard to the intersection (between LK3 and LK4) which is the guide point a certain distance ahead from the vehicle. In S520, since the guiding information GP6 is present on the intersection, the travel guiding execution unit 37 determines that "there is the guiding information". Similar to the guiding information GP1, the voice reproduction unit 39 reproduces the guiding voice based on the guiding information GP6. When the using vehicle 2B turns left at the intersection of the road section LK3 and travels along the road section LK4, the position ahead from the intersection is the destination "GOAL", and the guide point does not exist and the guiding information also does not exist. When the using vehicle 2B arrives at the destination "GOAL", it is determined that the guiding is finished in S550.

As above, the processing in the information processing system 100 in the embodiment is described with the example of changing lane when considering the traffic jams or the like. However, in the information processing system 100, it is possible to use the submission information corresponding to any situation. For example, as illustrated in FIG. 9(a), in a case where the vehicle enters a building ST1 such as a store, there is a case where there is an obstacle TR such as a big tree in front of the point of left turn toward the building ST1. In such a case, it is difficult for the driver to see the building ST1 or the signboard, since even though the standard guiding speech saying "fifty meters ahead, please turn left" notifies, there is a possibility that the driver cannot turn at the correct position. However, when there is a conspicuous building ST2 at the point of left turn, if the easy-to-understand guiding voice such as "please turn left in front of the building ST2" is used, which is submitted by the submitting vehicle 2A, it is possible for the using vehicle 2B to turn at the correct position without taking a mistake. In addition, for example, as illustrated in FIG. 9(b), when the vehicle turns at the intersection of five different roads, if only the standard guiding voice notifies, there is a possibility that the driver may turn to the wrong direction. However, if an easy-to-understand guiding speech saying "please enter the road between the building ST1 and the building ST2" is used, which is submitted by another vehicle, it is possible for the using vehicle 2B to turn to the correct direction without taking a mistake. In every situation other than the situation described above, it is possible to perform the travel guiding based on the submission information.

Next, the operation and effect of the information processing system 100, the center server 1, and the information processing device 10A and 10B in the present embodiment will be described.

Next, an information processing device according to the comparative example will be described. The information processing device according to the comparative example is a car navigation device mounted on the using vehicle. This car navigation device also performs the travel guiding by the guiding voice at the guide point such as a right or left turning point of the intersection. However, the guiding voice is provided as the standard data, and is generated uniformly based on the map data kept by the car navigation device itself and certain parameters. Therefore, in the guiding voice, there is a case where the actual traffic situation cannot be reflected or there is a case where the situation of features which exist around the intersection but are not included in the data cannot be reflected. For example, in a case where the vehicle turns right or left at the intersection illustrated in FIG. 6, when the vehicle reaches in front of the intersection, the car navigation device uniformly and only notifies that "in what meters from here, there is an intersection, please change lane". However, depending on the intersection, there is a case that it is difficult to recognize the intersection from far away, and a right or left turning lane becomes suddenly jammed just in front of the intersection. In such a situation, there is a situation that, if the vehicle does not change lane a significant distance in front of the intersection, the vehicle has to interrupt the jammed line, and even there is also a situation that the vehicle cannot turn right or left. In addition, in the situation in FIG. 9(*a*) described above, since there is the obstacle TR which is not reflected in the map data and the driver cannot recognize the left turning point, there is a case where the vehicle cannot correctly turn even when the driver hears the uniform guiding voice. In addition, in the complicated intersection as in FIG. 9(*b*), there is a case where it is difficult to understand the uniform guiding voice and the vehicle cannot turn to the correct direction. As described above, in the car navigation device in the comparative example, there is a case where the best guiding cannot always be performed for the driver of the using vehicle.

On the other hand, in the information processing system 100 in the present embodiment, the travel guiding execution unit 37 of the information processing device 10B in the using vehicle 2B executes the travel guiding using the guiding information of the guiding information accumulation unit 23 of the center server 1. Then, the guiding information accumulated in the guiding information accumulation unit 23 of the center server 1 is the information based on the submission information submitted by the submitting vehicle 2A that is different from the using vehicle 2B in which the travel guiding is executed. That is, the guiding information used in the travel guiding is the information based on the submission information from the submitting vehicle 2A which actually travels along the road or the like. In this way, the travel guiding execution unit 37 of the using vehicle 2B can perform the easy-to-understand travel guiding for the driver of the using vehicle 2B. Like this, by providing the guiding information based on the submission by another user, it is possible to provide the travel guiding which is suitable from the user's standpoint. In addition, if the occupant of the submitting vehicle 2A is a person who knows the road situation well, it is possible to provide accurate advice to the using vehicle 2B via the center server. That is, for the driver of the using vehicle 2B, it is possible to travel along the road with a feeling of riding together in the vehicle with a road guiding who is very familiar with the road. In addition, since the submission information from the vehicle which is actually traveling along the road is used, it is possible to quickly cope with environmental changes with which the updating of the map data cannot keep up.

In addition, in the center server 1 in the present embodiment, the guiding information extraction unit 27 extracts the guiding information which corresponds to the predetermined guide point on the traveling route of the using vehicle 2B to the preset destination, from the guiding information accumulation unit 23. The guiding information accumulated in the guiding information accumulation unit 23 is the information based on the submission information submitted from the submitting vehicle 2A that is different from the using vehicle 2B in which the travel guiding is executed. That is, the guiding information used in the travel guiding in the using vehicle 2B is the information based on the submission information from the submitting vehicle 2A which actually travels on the road or the like. In this way, in the using vehicle 2B, it is possible to perform the easy-to-understand travel guiding for the driver of the using vehicle 2B.

In the information processing device 10B which is mounted on the using vehicle 2B, the travel guiding execution unit 37 executes the travel guiding using the guiding information acquired from the center server 1. The guiding information acquired from the center server 1 is the information based on the submission information submitted from the submitting vehicle 2A that is different from the using vehicle 2B in which the travel guiding is executed. That is, the guiding information used in the travel guiding in the using vehicle 2B is the information based on the submission information from the submitting vehicle 2A which actually travels on the road or the like. As a result, in the using vehicle 2B, the easy-to-understand travel guiding for the driver of the using vehicle 2B can be performed.

In the information processing device 10A which is mounted on the submitting vehicle 2A, the data upload unit 13 transmits the acquired submission information to the center server 1 in association with the travel trajectory information. Then, if the guiding information based on the acquired submission information is accumulated in the center server 1, by transmitting the guiding information to another using vehicle 2B which moves along the same travel trajectory, the guiding information can be used in the using vehicle 2B as the travel guiding. This guiding information is the information based on the submission information submitted from the submitting vehicle 2A that is different from the using vehicle 2B in which the travel guiding is executed. That is, the guiding information used in the travel guiding in the using vehicle 2B is the information based on the submission information from the submitting vehicle 2A which actually travels on the road or the like. As a result, in the using vehicle 2B, the easy-to-understand travel guiding for the driver of the using vehicle 2B can be performed.

The center server 1 includes the guiding information extraction unit 27 that extracts the guiding information from the guiding information accumulation unit 23 based on the path information of the using vehicle 2B. In addition, the data upload unit 13 transmits the travel trajectory information of the submitting vehicle 2A to the center server 1 in association with the submission information. The guiding information extraction unit 27 extracts the guiding information by comparing the path information of the using vehicle 2B with the travel trajectory information of the submitting vehicle 2A, which is associated with the submission information. In this way, the guiding information extraction unit 27 of the center server 1 can extract only the guiding information necessary for the path along which the using vehicle 2B tries to travel.

In addition, the submission information is the voice data from the occupant of the submitting vehicle 2A. Since the voice data is used, the occupant of the submitting vehicle 2A can easily generate the submission information even during the driving operation.

In addition, in a case where the guiding information which corresponds to the predetermined guide point on the traveling route and which is based on the submission information cannot be acquired, the travel guiding execution unit 37 executes the travel guiding using the guiding information which is included in the travel guiding execution unit 37 as the standard data. In this way, it is possible to execute the travel guiding even with respect to the guide point in which the guiding information based on the submission information from another submitting vehicle 2A does not exist.

The present invention is not limited to the above-described embodiment.

A form of the submission information submitted from the submitting vehicle 2A is not particularly limited, and any form may be adopted, with which the intention of the occupant can be transferred. For example, the voice data that can be acquired by sound recording as in the embodiment described above may be adopted, or the data that can be acquired by character input, and the data that can be acquired by the operation of a touch panel or button may also be adopted. For example, the data may be submitted by the submitting vehicle 2A by typing the characters saying "please turn here", or by touching the button which is in a waiting state with a display saying "please turn here" on the display screen. In addition, the image data acquired by the image capturing may also be adopted. For example, the image of the building may be attached to be submitted together with the voice or characters saying "Please turn in front of that building". In addition, the output form provided to the driver of the using vehicle 2B side is not particularly limited, either. The form of the submission information and the output form in the using vehicle 2B may or may not be coincident with each other. For example, the character data may be submitted from the submitting vehicle 2A and converted into the voice data, and then the guiding voice may be output to the using vehicle 2B. Conversely, the voice data may be submitted and converted into the character or image data, and then the character or image data may be displayed in the using vehicle 2B.

In addition, a part of processing performed in any of the center server 1, the information processing device 10A, or the information processing device 10B may be performed in another part. For example, in the above-described embodiment, the information processing device 10B of the using vehicle 2B performs the detection of the traveling route. However, at least the inputting of the destination may be performed in the using vehicle 2B and the detection of the traveling route may be performed by the center server 1 (that is, the traveling route detection unit 32 and the map data 33 are provided in the center server 1). The center server 1 transmits the traveling route in addition to the guiding information. In addition, a part or all of the processing performed in the data processing unit 22 of the center server 1 may be performed in the information processing device 10A and/or in the information processing device 10B. That is, the submitting vehicle 2A may submit the submission information after the data processing to some extent, or the using vehicle 2B may use the acquired guiding information after the data processing to some extent.

Industrial Applicability

The present invention can be used in the information processing system, the information processing device, and the center server.

Reference Signs List

1 center server
10A, 10B information processing device
11 submission information acquisition unit
13 data upload unit
21 submission information receiving unit
23 guiding information accumulation unit
27 guiding information extraction unit
28 guiding information transmission unit
34 guiding information request unit
37 travel guiding execution unit
2A submitting vehicle (first moving object)
2B using vehicle (second moving object)

The invention claimed is:

1. An information processing system comprising: a center server; a first moving object that performs communication with the center server; and a second moving object that performs communication with the center server, wherein the first moving object includes a submission information acquisition unit that acquires submission information related to a travel guiding including information for navigating the first moving object through a particular path input by an occupant of the first moving object while moving through the particular path, and a submission information transmission unit that transmits the submission information to the center server, wherein the center server includes a guiding information accumulation unit that accumulates guiding information which is based on the submission information, wherein the second moving object includes a travel guiding execution unit that executes a travel guiding for the second moving object with respect to a traveling route to a preset destination, and wherein the travel guiding execution unit executes the travel guiding using the guiding information in the guiding information accumulation unit, wherein the center server further includes a guiding information extraction unit that extracts the guiding information from the guiding information accumulation unit based on path information of the second moving object, wherein the submission information transmission unit transmits travel trajectory information of the first moving object in association with the submission information to the center server, and wherein the guiding information extraction unit extracts the guiding information by comparing the path information of the second moving object with the travel trajectory information of the first moving object which is in association with the submission information.

2. The information processing system according to claim 1, wherein the submission information is voice data from an occupant of the first moving object.

3. A center server that performs communications between a first moving object and a second moving object, comprising: a submission information receiving unit that receives submission information related to a travel guiding from the first moving object and receives travel trajectory information of the first moving object in association with the submission information, the submission information related to the travel guiding including information for navigating the first moving object through a particular path input by an occupant of the first moving object while moving through the particular path; a guiding information accumulation unit that accumulates guiding information which is based on the submission information; a guiding information extraction unit that extracts the guiding information from the guiding information accumulation unit based on path information of the second moving object; and a guiding information transmission unit that transmits the guiding information extracted from the guiding information extraction unit to the second moving object, wherein the guiding information extraction unit extracts the guiding information which corresponds to a predetermined guide point on a traveling route of the second moving object up to a preset destination, and wherein the guiding information extraction unit extracts the guiding information by comparing the path information of the second moving object with the travel trajectory information of the first moving object which is in association with the submission information.

4. An information processing device that is mounted on a moving object and performs communication with a center server, comprising: a guiding information request unit that transmits information related to at least a destination and path information of the moving object to the center server, and makes a request for guiding information to the center server, and a travel guiding execution unit that executes a travel guiding for the moving object with respect to a traveling route to the destination, wherein the guiding information request unit requests the guiding information which is based on submission information submitted from another moving object and travel trajectory information of the other moving object in association with the submission information, the submission information including information for navigating the other moving object through a particular path input by an occupant of the other moving object while moving through the particular path, and wherein, in a case where the guiding information is acquired, which corresponds to a predetermined guide point on the traveling route and which is based on the submission information, the travel guiding execution unit executes the travel guiding using the guiding information, and wherein the guiding information is determined based upon comparing the path information of the moving object with the travel trajectory information of the other moving object which is in association with the submission information.

5. The information processing device according to claim 4, wherein, in a case where the guiding information cannot be acquired, which corresponds to the predetermined guide point on the traveling route and which is based on the submission information, the travel guiding execution unit executes the travel guiding using the guiding information provided in the travel guiding execution unit as standard data.

6. An information processing device that is mounted on a moving object and performs communication with a center server, comprising: a submission information acquisition unit that acquires submission information related to a travel guiding including information for navigating the moving object through a particular path input by an occupant of the moving object while moving through the particular path; and a submission information transmission unit that transmits travel trajectory information of the moving object to the center server in association with the submission information, wherein the center server includes a guiding information extraction unit that extracts guiding information based on path information of another moving object by comparing the path information of the other moving object with the travel trajectory information of the moving object which is in association with the submission information.

* * * * *